Figure 1:
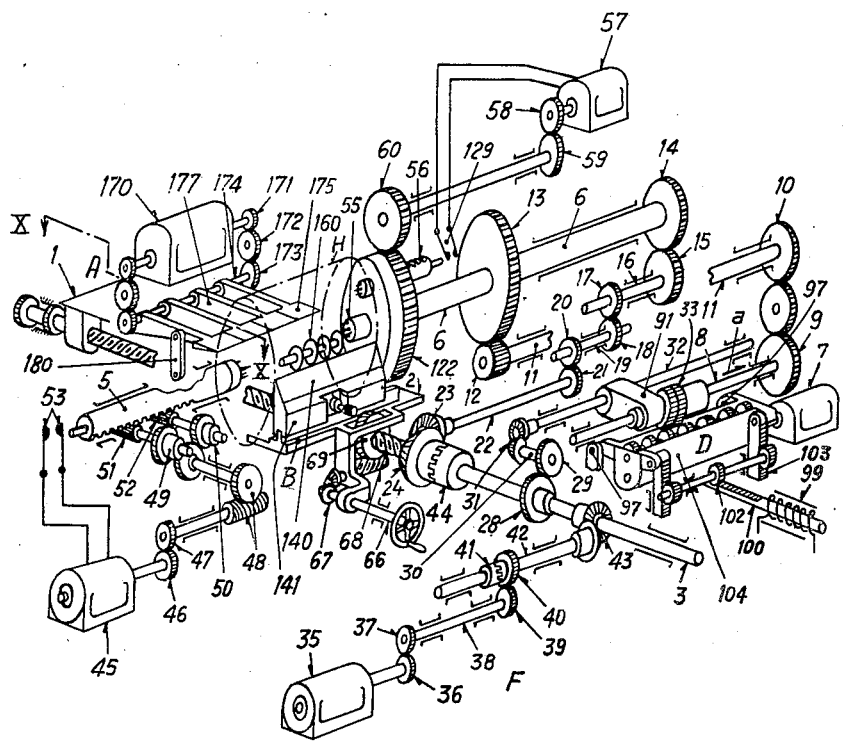

March 4, 1952  O. SCHNELLMANN  2,587,655
MACHINE FOR MANUFACTURING MATCH SPLINTS
Filed Nov. 7, 1945  6 Sheets-Sheet 1

Inventor
OSCAR SCHNELLMANN
By
Attorneys

March 4, 1952     O. SCHNELLMANN     2,587,655
MACHINE FOR MANUFACTURING MATCH SPLINTS
Filed Nov. 7, 1945     6 Sheets-Sheet 2
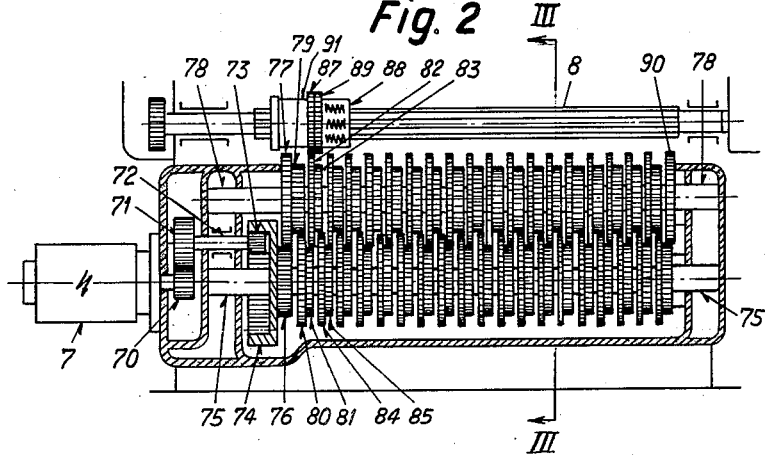
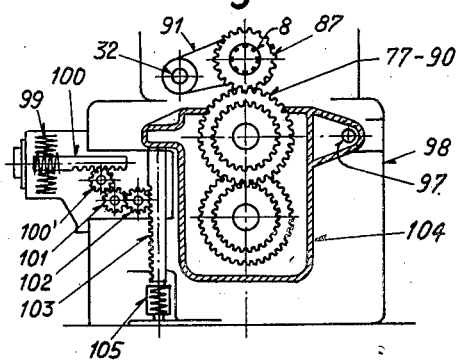
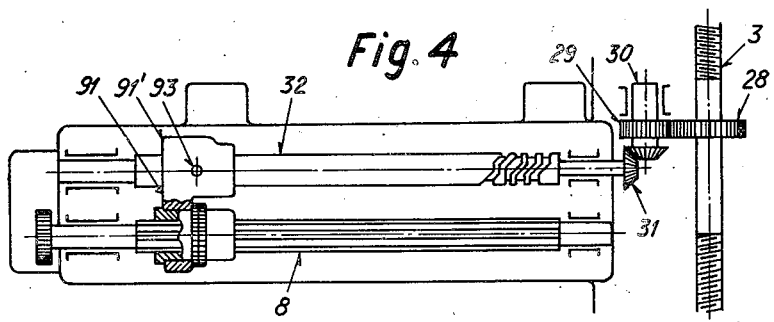
INVENTOR
Oskar Schnellmann
BY
ATTORNEYS

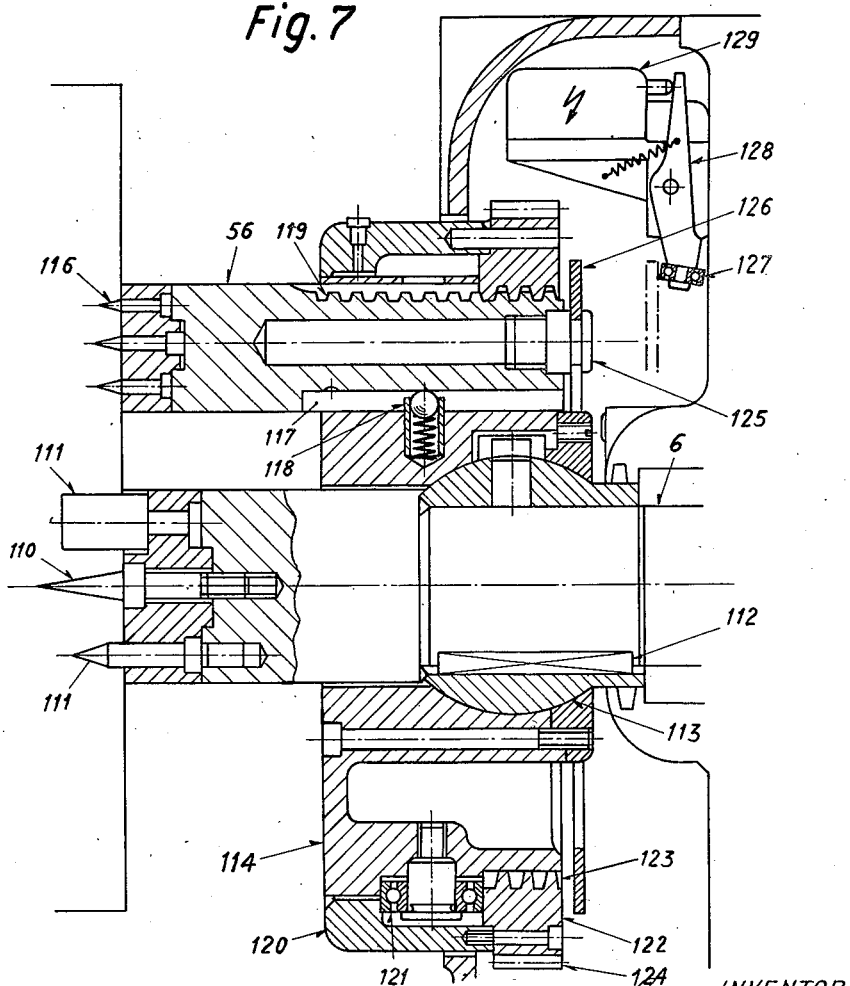

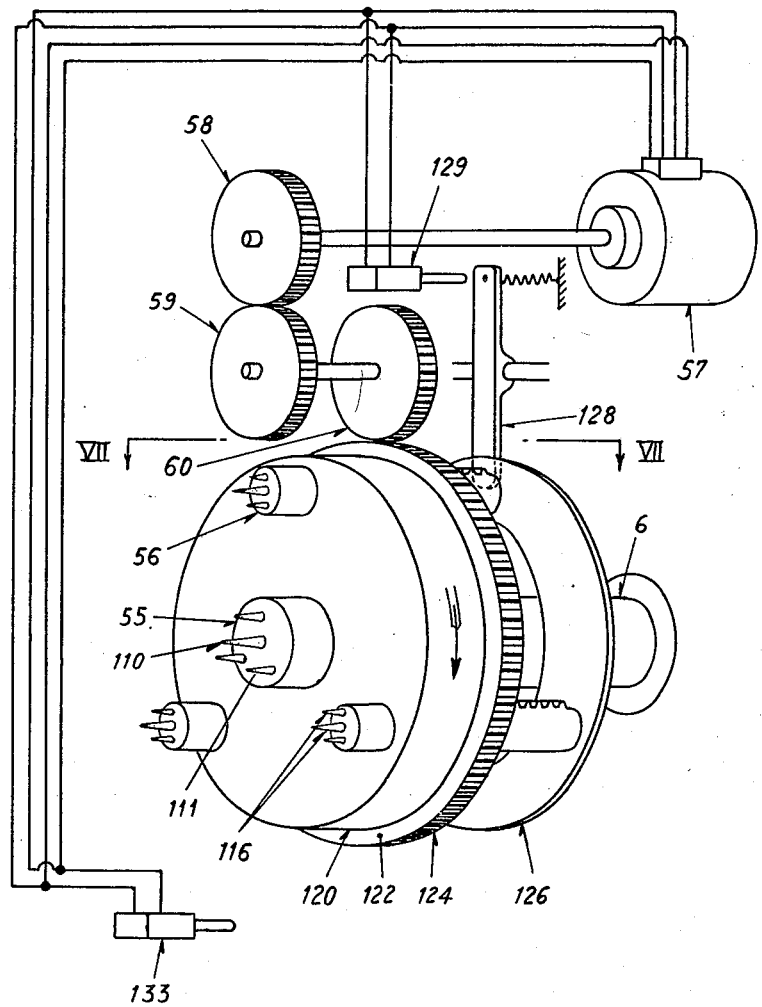

March 4, 1952     O. SCHNELLMANN     2,587,655
MACHINE FOR MANUFACTURING MATCH SPLINTS
Filed Nov. 7, 1945     6 Sheets-Sheet 5
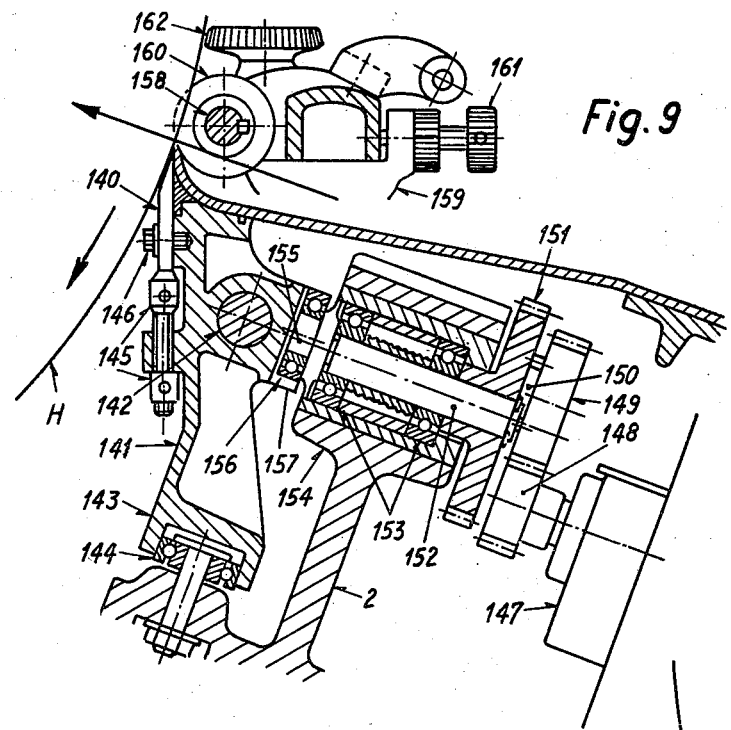
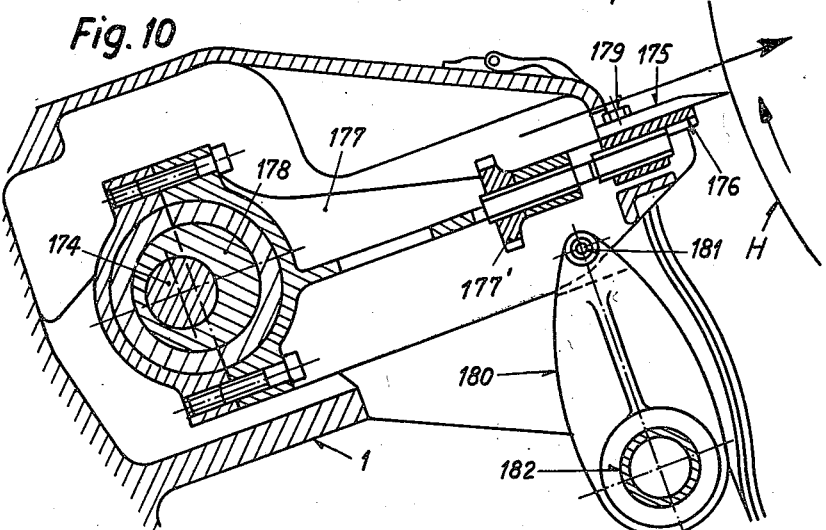
INVENTOR
Oskar Schnellmann
BY
ATTORNEYS March 4, 1952  O. SCHNELLMANN  2,587,655
MACHINE FOR MANUFACTURING MATCH SPLINTS
Filed Nov. 7, 1945  6 Sheets-Sheet 6

INVENTOR
Oskar Schnellmann
BY
ATTORNEYS

Patented Mar. 4, 1952

2,587,655

UNITED STATES PATENT OFFICE 2,587,655

MACHINE FOR MANUFACTURING MATCH SPLINTS

Oskar Schnellmann, Zurich, Switzerland, assignor to Machine Tool Works Oerlikon, Administration Company, Zurich-Oerlikon, Switzerland, a company of Switzerland Application November 7, 1945, Serial No. 627,231
In Switzerland November 8, 1944

7 Claims. (Cl. 144—50)

The present invention relates to a machine for manufacturing match splints operating according to the method in which, in one single working cycle, incisions are formed in the periphery of a wood cylinder carrying out a rotating motion, these incisions running radially and parallel to the axis of rotation, and being of a depth, and at distances apart from one another corresponding to the thickness of the match splint to be produced, whereupon the peripheral layer thus provided with incisions is peeled off, and the match splints drop down separately.

The object of the present invention is to provide reliable devices to be used with this machine, by means of which it will be possible to increase the rotating speed of the wood cylinder to be peeled off, as its diameter is reduced, to such an extent as to maintain a theoretically almost constant cutting speed notwithstanding the decreasing diameter of the wood cylinder.

In machines of this kind, a slide mounted on one side of the wood cylinder to be peeled off carries cutting knives forming in the wood cylinder incisions in an axial direction at distances apart from one another corresponding to the thickness of the match splint, whilst on the opposite side another slide carries cutting discs forming in the wood cylinder, in its circumferential direction, incisions at distances apart from one another corresponding to the length of the finished match, whereupon by means of a peeling knife the pre-cut peripheral layer is peeled off in the required thickness, the match splints dropping down separately. The chief difficulty was hitherto the production of match splints of uniform cross section, since the increase in the rotating speed of the wood cylinder was not brought about by automatic means and the transmission to the wood cylinder of the rotating motion of the headstock spindle was effected by drivers acting only in close vicinity to the axis of the cylinder, these drivers being unable to prevent a rearward movement of the cylinder in a direction opposite to the direction of rotation, since small knots and other irregularities operated to make cutting more difficult during the peeling process, which circumstance renders more particularly difficult the handling of wood cylinders of comparatively large diameter. The consequence was that wood cylinders of a diameter exceeding 40 cm. could not be handled at all, this being a serious drawback since wood cylinders can only be peeled down to a diameter of approximately 10 cm., the core of the wood cylinder being no longer suitable for producing match splints.

Means had therefore to be found for having the wood cylinder carried along by the drivers in an absolutely reliable manner; also means for cutting through knots more easily, thus preventing undue increase of the cutting pressure. The present invention is characterised by the provision of a constant-speed motor for driving stepped gearing and a speed change gear for the headstock spindle rotating the wood cylinder to be peeled, the speed change gear controlling the required cutting speed, and the stepped gearing increasing the rotating speed of the wood cylinder in accordance with the decrease in diameter of the latter, in order to keep the cutting speed constant; the rotating speed of the headstock spindle being transmitted over a change gear to a threaded spindle controlling the feed of the knives; the threaded spindle, at the same time, effects the speed change of the stepped gearing; the transmission of power from the headstock spindle to the wood cylinder being furthermore effected by drivers engaging the centre of the wood cylinder, and besides by further flexibly mounted drivers engaging the wood cylinder eccentrically; the peeling knife furthermore accomplishing in the axial direction of the wood cylinder a reciprocating motion, and the cutting knife following the rotating motion of the wood cylinder in the course of the peeling process.

Figure 1A:
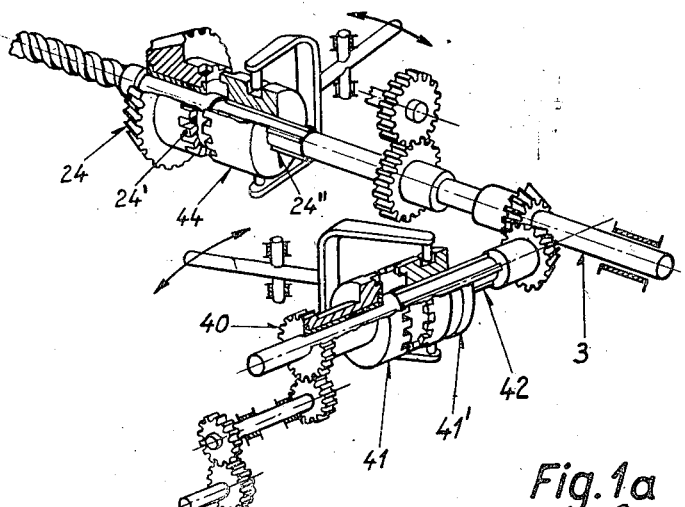
Figure 11:
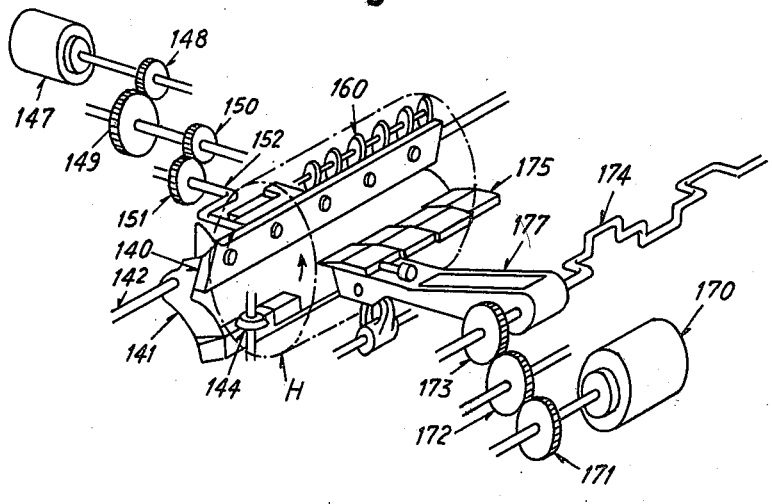
Figure 12:
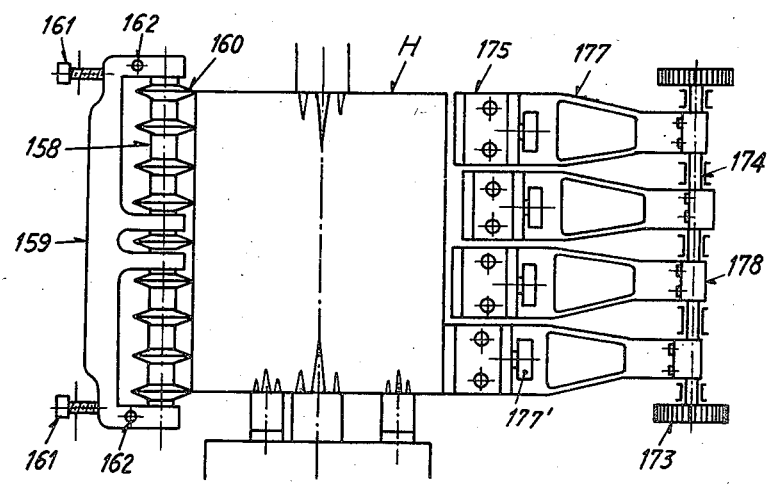

An example of the machine according to the present invention is represented on the accompanying drawings, wherein Fig. 1 is a perspective view of the arrangement of the various gears in relation to each other, Fig. 1a shows the clutch mechanism for the gearing on an enlarged scale, Fig. 2 shows a longitudinal view of the stepped gearing, Fig. 3 a transverse section through this gearing along the line III—III of Fig. 2, Fig. 4 a plan view of the gear mechanisms of the speed change of the stepped gearing according to Figs. 2 and 3, Fig. 5 an enlarged detail showing the gear shift lever shaft of Fig. 4, Fig. 6 the schematic reproduction of power transmission in the stepped gearing, Fig. 7 a vertical cross section through the driver arrangement along the line VII—VII of Fig. 8, Fig. 8 a perspective view of the drivers for transmitting to the wood cylinder the rotating motion of the headstock spindle, together with their driving organs, Fig. 9 is a vertical cross section showing portions of the device, including the reciprocating means for the peeling knife, Fig. 10 the cutting knife arrangement, partly in section along the line X—X of Fig. 1, Fig. 11 schematically the arrangement and driving mechanism of the movable knives, and Fig. 12 the fixed cutting discs and cutting knives, as viewed from above.

In the perspective view of Fig. 1, group A shows the mechanism for the cutting knives; group B the knives for circumferential cutting and the peeling knife. The cutting knives are fitted on the slide 1 on the one side of the wood cylinder H, and group B is fixed on slide 2 on the other side of the wood cylinder. Slides 1 and 2 are arranged on a frame, and driven by the threaded spindle 3, provided with left and right-handed threads towards, and away from, the wood cylinder H, respectively.

The wood cylinder H is clamped between the tailstock spindle 5 and the headstock spindle 6. The headstock spindle 6 is driven by the motor 7. The drive is effected over stepped gearing D— which will be described later on—which transmits the rotary motion to a shaft 8. From the shaft 8 the rotary motion is transmitted, over change gears 9 and 10, to the spindle 11 which, in conjunction with wheel 12, transmits the rotary motion to wheel 13 of the headstock spindle 6. For adjusting the rotary speed of the headstock spindle 6 the motion is transmitted from here, over change wheels 14 and 15, to a shaft 16. From the shaft 16 it is further transmitted, over wheels 17—18, to a shaft 19, and from the latter, over wheels 20—21, to a shaft 22. The wheels 14 and 15 are interchangeable, so that the speed ratio of headstock spindle 6 to shaft 22 may be selected as desired. Over bevel wheels 23—24, the shaft 22 drives the threaded spindle 3 which imparts to the knife slides 1 and 2 a movement directed towards the wood cylinder H, thus effecting the required feed. Since the feed of the peeling knife and the number of strokes of the cutting knives are constant, it is necessary to increase the speed of the headstock spindle 6 in accordance with the gradual decrease in diameter of the wood cylinder as a result of the peeling process, in order that the circumferential speed, and consequently the cutting speed as well, should always remain the same. For this purpose, the speed changes of the stepped gearing D are effected by the threaded spindle 3, over wheels 28—29, shaft 30 and bevel gear wheel 31, and shaft 32. Shaft 32 is provided with a curved groove 92, as shown in Fig. 5, in which a bolt 93 (Fig. 4) is inserted and fixed in stirrup 91, by means of which the feed wheels 87 and 89 are shifted from one step to the other of the stepped gear wheel mechanism, in the direction indicated by the arrow a shown in Fig. 1.

A quick return mechanism F is used for bringing the stepped gear wheel and the slides 1 and 2 quickly back into their initial position. Motor 35 drives wheels 36—37, shaft 38, wheel 39, wheel 40 with the clutch 41 acting in one direction only, which, over shaft 42 and bevel gear wheel 43, drives the threaded spindle 3 in the backwards direction. In the forward direction of the spindle 3 the clutch 41 prevents the rotation of shaft 38. Wheel 24 is also provided with a clutch 44 acting in one direction only, so that when the threaded spindle 3 rotates to the right the shaft 22 is not carried along in this rotating movement.

The clutch mechanism on the shafts 2 and 42 is shown more in detail in Fig. 1a. In the normal operation of the apparatus, the rotation of the spindle 3 is effected through the gears 21, 23 and 24. The wheel 24 is loosely mounted on the spindle 3 and is provided with coupling teeth 24', while the clutch member 44 is axially movable on the shaft 3 and is rotatively coupled with the spindle 3 by way of key 24". During normal operation, the clutch member 44 is interlocked with bevel gear 24, and thereby effects operation of the spindle 3. The clutch 41, 41' is disengaged so that the drive 40, 39, 38, 37 and 36 operated by the motor 35 is disconnected from the spindle 3. On rapid movement of the carriages A and B the coupling 41, 41' is thrown in with simultaneous disengagement of the coupling 24', 44, whereby the spindle drive 21, 23, 24 is thrown out of operation. The wheel 40, 41 is loosely mounted on the shaft 42, while the coupling member 41' is axially movable but is splined to the shaft 42 to rotate therewith.

The clamping of the wood cylinder H is effected on the one hand by the tailstock spindle 5 which is driven from the motor 45, over wheels 46—47, worm and gear wheel 48 and the two safety couplings 49 and 50, pinions 51 and 52 engaging into teeth of the tailstock spindle 5, whereby the latter is moved towards, or away from, the wood cylinder. In the end withdrawal position the motor is disconnected by the limit switch 53. On the headstock spindle side the wood cylinder H is gripped and carried along by the driver 55 fitted in the extension of the headstock spindle 6. On an oscillating plate represented on Fig. 7 there are, for instance, arranged three drivers 56 which are moved axially by the motor 57, over wheels 58, 59, 60 and internal threaded ring 122, forward and backward, in a similar manner to the tailstock spindle.

The arrangement of the drivers 56 is shown on Figs. 7 and 8 and will be more fully described later on. For adjusting the slides 1 and 2 in relation to one another prior to starting work, the worm 68, and together with this the worm wheel 69 can be rotated by means of hand wheel 65 through shaft 66 and bevel gear wheel 67. The worm wheel 69 engages the worm 68 irreversably, the bore of the latter being provided with a thread which engages in the thread of the spindle. The worm wheel 69 is rotatably connected with the slide 2 but is axially immovable, so that it serves as a threaded nut of the slide 2, because it is locked in the worm 68. By rotation of the worm 68 through the hand wheel 65, which is positioned on the shaft 66, the slide 2 is moved toward slide 1.

On Figs. 2, 3, 4 and 5 are shown further details of the stepped gearing and its switching arrangement. Fig. 6 shows the method of speed transmission in the gear box. The automatic regulation of the speed of the headstock spindle 6, to keep the circumferential speed of wood block H approximately constant despite its diminishing diameter, is accomplished by the separate motor 7, the stepped drive D and the drive of the shaft 32. By means of the wheel 87 (Fig. 2) which shifts from step to step in the stepped drive, the shaft 8, on which it slides, is driven faster and faster and transmits this rotary velocity by way of wheel 9, 10, shaft 11 and wheel 12 to the headstock spindle 6, and the latter, with the wheel 14, drives the shaft 32, which effects the advance of the wheel 87, by way of the gears 15, 17, 18, 20, 21, 23, 24, 28, and 29 and the bevel drive 31. Motor 7 drives the pinion 70 which in its turn drives wheel 71. This wheel 71 drives, over shaft 72, the pinion 73. This pinion engages the inner toothing 74 loosely rotatable on the fixed shaft 75. Connected with wheel 74 is spur wheel 76 which engages wheel 77, also loosely rotatable on the fixed shaft 78. Secured to wheel 77 is a smaller wheel 79. Wheel 79 engages wheel 80 on shaft 75 which is secured to wheel 81. Wheel 81, in its turn, engages wheel 82, which again, by way of wheel 83, transmits its rotation to the wheel pair 84—85. The stepped gearing thus consists of two groups of two wheels each, of which the one is larger than the other. In this manner, the rotary speed transmitted from the motor constantly and uniformly decreases. The rotary speed of the last wheel 90 is thus lower than at the first wheel 77. The whole range includes approximately 30 steps. The speed ratio is approximately 1:7. Each one of the larger spur wheels on shaft 78 therefore transmits a lower speed to wheel 87. By means of this stepped gear wheel an almost constant circumferential speed can be obtained automatically. In order to facilitate the introduction of wheel 87, when shifting it from one wheel group to another, a wheel 89 connected with wheel 87 by means of a friction clutch 88 has been provided. Wheels 87 and 89, as well as clutch 88, are seated near the stirrup 91, laterally non-displaceable but rotatable, and can be shifted along the shaft 8 which is provided with keyways. The shifting of the stirrup 91 is effected by the grooved shaft 32 represented in Fig. 5. The shaft 32 is provided with continuous step-shaped grooves 92 into which engages the bolt 93 (Fig. 4) seated in the guiding part 91' of the stirrup 91, by which the wheels 87 and 89 are shifted from wheel 77 to wheel 90.

At the start the wheel 87 engages the wheel 90 which has the lowest rotating speed. With decreasing diameter of the wood cylinder, as a consequence of the transmission of the rotary motion of the headstock spindle to the grooved shaft 32, the wheel 87 is shifted from one wheel group to the other, thus constantly increasing the rotary speed transmitted. When the wood cylinder is peeled down to the smallest diameter still permissible the stepped gearing must first be brought back into its initial position before starting the next peeling operation. For this purpose, the whole stepped gearing is suspended on two swivel bolts 97 of the casing 98 (Fig. 3), in such a manner that by lowering the gear the wheels 77 to 90 are thrown out of engagement with the wheels 87, thus enabling the stirrup 91 to be quickly shifted along the shaft 8. The lowering of the gearing around the bolts 97 is effected by an electro-magnet 99 which operates the gears 100', 101, 102 and the toothed racks 100 and 103. By way of the gears 100', 101, 102, the toothed rack 100 actuates the toothed rack 103, on which the casing 104 containing the stepped gearing rests, causing it to move downwards. The weight of the casing 104 is partly compensated by the spring 105 in order that the magnet 99 only has to overcome a part of the weight of the casing 104 for setting the gears 87 and 89 in their initial position.

Figs. 7 and 8 represent the mechanism for driving the wood cylinder.

In Fig. 7, 6 designates the headstock spindle. Its front end is provided with a centering point 110 and three drivers 111. The spindle 6 has a spherical head 113 keyed on by means of cotter 112. On this spherical head is movably supported the oscillating disc 114 which, by way of example, is fitted with three driver bolts 56. The driver bolts 56 are provided at their front end with points 116. In the oscillating disc 114 these driver bolts are axially displaceable, a rotating movement being prevented by key-way 117 and a lock 118 engaging into the key way. The side of the driver bolt 56 opposite to the key-way 117 is fitted with sloping teeth 119. The axial movement of the bolts 56 and in the direction of the wood cylinder, is effected by the motor 57 which is cut in by the switch 133 before the cutting knife or the peeling knife arrives in the vicinity of the points 116 to operate on the wood cylinder. The switch 133 can be actuated by a stop (not shown) arranged on the carriage 1 or 2. The cutting out of the motor, as described hereinafter, is accomplished by the switch 129 when the bolts 56 reach their return position. For shifting the bolts 56 on setting up a new wood cylinder H, hand-operated switches, not shown in detail, can be provided. On the oscillating disc 114 is rotatingly seated a ring 120 laterally held by several ball bearings 121. To the ring 120 is fixed the ring 122 which has an internal thread 123, and is fitted on its outer diameter with gear teeth 124. The thread 123 of the ring 122 engages the teeth 119 of the driver bolts 56. Thus, by rotating the ring 122, the driver bolts 56 move towards, or away from, the wood cylinder. To the driver bolts 56 is fitted by means of bolt 125 a ring 126 which presses against the ball bearing 127 of the control lever 128. The control lever 128 effects by means of switch 129 the interruption of the circuit of the motor 57, Figs. 1 and 8, which, over wheels 58, 59, 60, drives the threaded ring 122, the interruption taking place the moment the driver bolts reach their extreme withdrawal position. A stop (not shown) operates the switch 133 for switching on the motor, so that the withdrawal movement of the drivers takes place when the peeling process is so far advanced that the peeling knives reach the vicinity of the driver bolts 56.

Fig. 9 shows a section through the arrangement of the peeling knives. The peeling knife 140 is fixed on a knife-holder 141 mounted on the spindle 142 and guided, that is, laterally displaced, by means of a fork 143 on ball bearings 144. The peeling knife 140 is adjustable in height by means of seat screws 145 and is clamped in the desired position by means of the screws 146. The wheel 151, fixed on the shaft 152, is driven from the motor 147, over wheels 148, 149 and 150. The shaft 152 is mounted, by means of ball bearings 153, in the arm 154 of the slide 2. The front end of the shaft 152 is provided with a crank pin 155 fitted with a ball bearing 156. This ball bearing 156 rolls up and down in a vertical slot 157 of the knife holder 141, thus imparting to the knife holder a reciprocating motion in horizontal direction and causing the knife to carry out a pendulum cut, thus overcoming more easily any resistance due to knots or similar causes. Above the peeling knife 140 on the shaft 158 mounted in the holder 159 which is displaceably fitted in the slide 2, there are fixed cutting discs 160 arranged at a distance from one another corresponding to the splint length, which cut grooves into the periphery of the wood cylinder H. The cutting discs 160 suitably consist of circular knife discs which can be rotatably fixed on the shaft 158 and roll on the wood cylinder H; they may, however, be rigidly fixed as well and act as fixed cutting discs. The only reason for adopting the circular knife form is to be able, by rotating the disc, to renew its cutting portion when the cutting edge becomes blunt. By means of the screws 161 the holder 159 can be adjusted so as to secure the desired cutting depth, and be locked in position by means of the screws 162. (See also Fig. 12.) The distance between the cutting discs 160 is adjustable, so as to afford the possibility of producing match splints of various lengths; naturally also, the number of discs to be used may vary.

The driving arrangement for carrying out the lateral movement of the peeling knife 140 is schematically represented in Fig. 11.

The cutting knife arrangement is fixed on the slide 1 (Figs. 1 and 10). It is advisable to provide several cutting knives, each one with a separate drive, distributed over the length of the wood cylinder. It has already been mentioned that these knives form longitudinal incisions in the wood cylinders, thus splitting the strip precut by the cutting discs 160 into individual splints. The driving speed of all cutting knives is constant; the drive takes place from a common separate motor 170 (Figs. 1 and 11). Over the wheels 171, 172, 173 this motor drives the crank shaft 174. Since the wood cylinder H carries out a continuous movement it is necessary that the cutting knives 175 execute not only a movement directed towards the axis of the wood cylinder, but also a movement into and out of the cylinder, regulated according to the path of the cylinder periphery. The movement of the cutting knives 175 into and out of the wood cylinder must be regulated to correspond as exactly as possible with the circumferential speed of the cylinder in order to form incisions in the wood cylinder in an axial direction and at distances apart from one another corresponding to the thickness of the match splint. Consequently, the cutting edge must carry out an elliptic motion. Fig. 10 shows one of the cutting knives 175, seen from the side, in combination with the parts which actuate the knife. Bolt 179 tightly fastens knife 175 on the slide 176 which is slidably mounted in the front part of the connecting rod 177, which can be adjusted in the desired position by means of the screw 177'. The rear part of the connecting rod 177 is in two parts and clasps one of the eccentrics 178 of the shaft 174. The connecting rod is articulated to a swing lever 180 by means of a bolt 181. The swing lever 180 is seated on the shaft 182; it serves not only for guiding the front part of the connecting rod 177, but also to impart to the cutting edge of the knife 175 a motion corresponding to the peripheral displacement of the wood cylinder H. By suitably selecting the position of the supporting point of the connecting rod the path of the cutting edge in moving into and out of the wood cylinder may be adapted to correspond with almost absolute precision to the path of the cutting line on the cylinder. The cutting edge thus carries out an elliptic movement. The cutting knife arrangement fitted on the slide 1 is moved by the spindle 3, according to the feed of the peeling knife 140, towards the wood cylinder H.

In order to be able to cut wood splints of different width the change wheels 9 and 10 must be changed. The circumferential speed of the wood cylinder is thus in principle modified, whilst the cutting stroke of the knives remains constant since the rotating speed of their driving motor 170 is constant. The number of cutting strokes falling on a given path of the cylinder periphery (this path remaining constant in view of the increasing speed of rotation of the cylinder) varies accordingly, the distance between them increasing or decreasing accordingly so as to produce match splints with a greater or smaller width.

The feed of the peeling knife, and consequently the thickness of the match splints, is determined by the change gear wheels 14 and 15. When the knives 175 are put out of operation, the cutting knives 160 and peeling knives 140 can be made to cut wood strips for making boxes.

I claim:

1. In a machine for manufacturing match splints and having a headstock and a headstock spindle and a slide on one side of the wood cylinder to be peeled, cutting knives arranged on said slide for forming incisions in the wood cylinder in an axial direction and at distances apart from one another corresponding to the thickness of the match splint, a second slide on the opposite side of the wood cylinder to be peeled, cutting discs mounted on such second slide for forming incisions in the wood cylinder in a circumferential direction and at distances apart from one another corresponding to the length of the match splint, and a peeling knife for peeling off the pre-cut peripheral layer from the cylinder in the required thickness, so that the splints drop down separately, the combination of a constant-speed motor, a stepped gear wheel mechanism and a speed change gear driven by the motor for rotating the headstock-spindle, said change speed gear determining the required cutting speed and the stepped gear wheel mechanism operating to maintain a constant circumferential speed with decreasing diameter of the wood cylinder by gradually increasing the speed of rotation of such cylinder; a threaded spindle controlling the feed of the peeling knife; a change gear arranged to transmit the rotation of the headstock spindle to said threaded spindle; intermediate gearing whereby said threaded spindle effects at the same time the speed change of the stepped gear wheel mechanism; drivers on the headstock for engaging the centre of the wood cylinder, additional movably mounted drivers engaging the cylinder eccentrically, means for moving said additional drivers out of engagement with the cylinder and means for reciprocating the peeling knife axially with respect to the wood cylinder, said cutting knives being mounted so as to follow the rotation of the wood cylinder in the course of the cutting process.

2. Machine for manufacturing match splints according to claim 1, wherein the stepped gearing is swingably mounted and includes a feed wheel, said machine including an electro-magnetic control device dependent on the circuit of the driving motor for bringing said gearing out of engagement with the feed wheel for the return of the latter to starting position.

3. Machine for manufacturing match splints according to claim 1, including an oscillating disc fitted to the headstock spindle, the eccentrically mounted drivers for driving the wood cylinder being slidingly arranged on said oscillating disc, the means for moving such drivers including an electric motor for axially displacing said drivers.

4. Machine for manufacturing match splints according to claim 3, including a limit switch for said electric motor, and wherein the drivers, in their position of extreme axial withdrawal from the wood cylinder, operate such limit switch to cut out said motor.

5. Machine for manufacturing match splints according to claim 1, including an oscillating disc fitted to the headstock spindle, the eccentrically mounted drivers for driving the wood cylinder being slidingly arranged on said oscillating disc, an electric motor, means operated by the motor for axially displacing said drivers, and a switch automatically cutting in the said motor to pull back the drivers of the oscillating disc as soon as the wood cylinder is peeled down to such an extent that the peeling knife gets close to the driver members.

6. Machine for manufacturing match splints according to claim 1, including means for normally locking the cutting discs so that they do not rotate during the cutting process, said discs being rotatable in order to bring into action a new portion of the cutting edge.

7. Machine for manufacturing match splints according to claim 1, including eccentrics for actuating the cutting knives, rods connected to the eccentrics and carrying the cutting knives at their free ends, and a swivel bracket supporting each eccentric rod, whereby the cutting edge of the knife describes an elliptic curve.

OSKAR SCHNELLMANN.

REFERENCES CITED

The following references are of record in the file of this patent:

UNITED STATES PATENTS

| Number | Name | Date |
| --- | --- | --- |
| 306,979 | Webber | Oct. 21, 1884 |
| 398,593 | Ellis | Feb. 26, 1889 |
| 1,293,230 | Stafford | Feb. 4, 1919 |
| 1,449,798 | Segebaden | Mar. 27, 1923 |
| 1,473,545 | Collier | Nov. 6, 1923 |
| 1,877,013 | Moore | Sept. 13, 1932 |
| 2,355,512 | Contratto | Aug. 8, 1944 |